(12) United States Patent
Budde

(10) Patent No.: US 6,417,996 B1
(45) Date of Patent: Jul. 9, 2002

(54) GIMBAL FOR A HEAD OF A DISC DRIVE WITH VERTICAL LIMITER

(75) Inventor: Richard A. Budde, Plymouth, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/158,647

(22) Filed: Sep. 22, 1998

Related U.S. Application Data
(60) Provisional application No. 60/059,451, filed on Sep. 22, 1997.

(51) Int. Cl.[7] .............................................. G11B 21/16
(52) U.S. Cl. ................................................... 360/245.7
(58) Field of Search .............................. 360/104, 245.7

(56) References Cited

U.S. PATENT DOCUMENTS

| | | | |
|---|---|---|---|
| 5,115,363 A | * 5/1992 | Khan et al. ................ | 360/104 |
| 5,125,750 A | 6/1992 | Corle et al. ................ | 359/819 |
| 5,377,064 A | * 12/1994 | Yaginuma et al. .......... | 360/104 |
| 5,497,359 A | 3/1996 | Mamin et al. ............ | 369/44.15 |
| 5,499,153 A | * 3/1996 | Uemura et al. ............ | 360/103 |
| 5,617,274 A | * 4/1997 | Ruiz ........................... | 360/104 |
| 5,771,136 A | * 6/1998 | Girard ........................ | 360/104 |
| 5,838,517 A | * 11/1998 | Frater et al. ................ | 360/104 |
| 5,877,920 A | * 3/1999 | Resh ........................... | 360/104 |

* cited by examiner

Primary Examiner—David Davis

(57) ABSTRACT

A base mounting portion connects the gimbal spring to a load beam and thereby to the actuator of the disc drive which positions the gimbal and slider over a desired track on the disc. The gimbal includes opposed spaced flexure arms which are formed of elongated members, each having a proximal end and a distal end which define an opening therebetween. The proximal ends of the flexure arms are operably coupled to the base, and the distal ends are cantilevered. A mounting tab is positioned between the ends of the flexure arms and supports the slider. Bridge sections are provided which connect the distal ends of the flexure arms to the mounting tab, the bridge sections extending at an angle relative to the flexure arms and being angled back toward the base section of the gimbal. The bridge sections support a limiter extending over said load beam to limit vertical movement of said load beam.

9 Claims, 2 Drawing Sheets

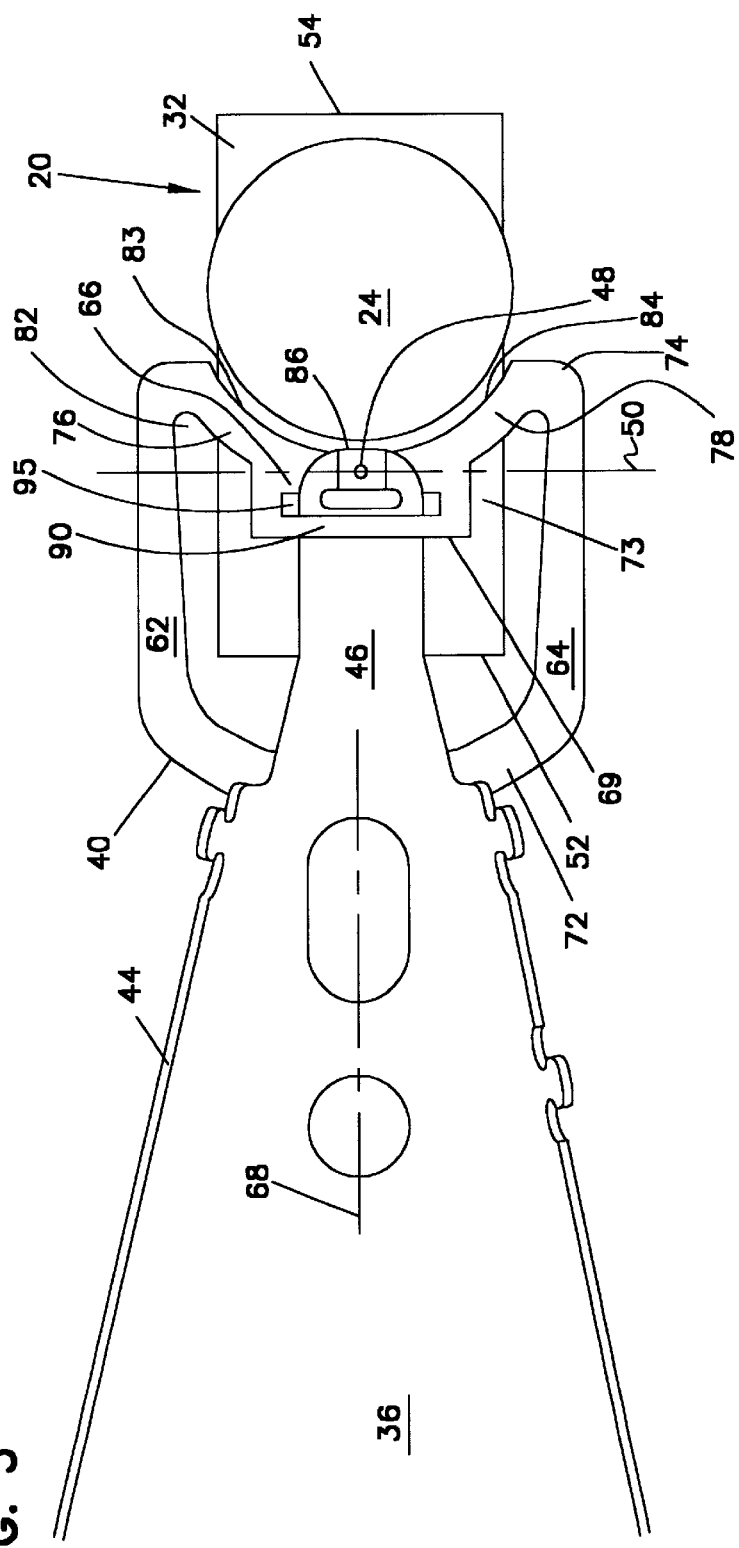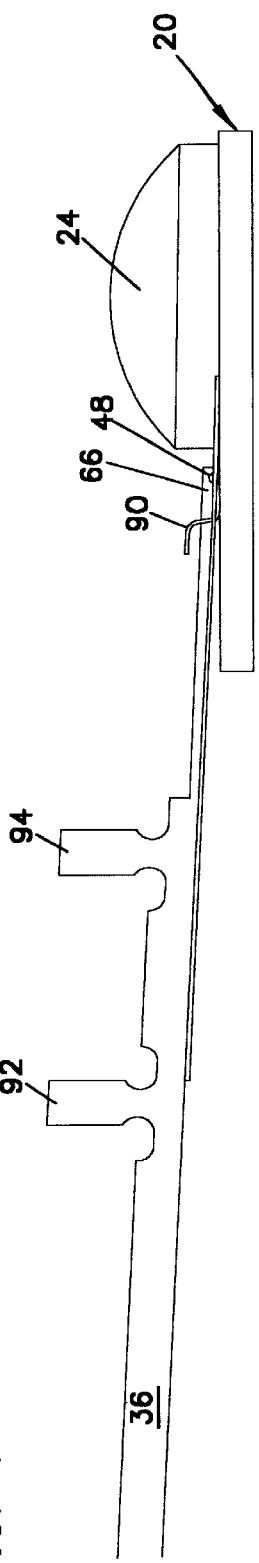

GIMBAL FOR A HEAD OF A DISC DRIVE WITH VERTICAL LIMITER

CROSS-REFERENCE TO RELATED APPLICATION

This application claims priority to U.S. Provisional Patent Application Ser. No. 60/059,451, filed Sep. 22, 1997, and entitled DEFLECTION LIMITER FOR AN OPTICALLY ASSISTED WINCHESTER DRIVE.

BACKGROUND OF THE INVENTION

The present invention relates to a disc drive assembly. In particular, the present invention relates to an improved suspension design for supporting a head relative to a disc surface.

Disc drive systems are known which read data from a disc surface during operation of a disc drive. Such disc drive systems include conventional magnetic disc drives and optical disc drive systems. Optical disc drive systems operate by focusing a laser beam onto a disc surface via an optical assembly which is used to read data from the disc surface. Conventional magnetic disc drive systems use inductive type heads for reading or writing or magneto-resistive (M) heads for reading data. Discs are rotated for operation of the disc drive via a spindle motor to position discs for reading data from or writing data to selected positions on the disc surface.

Known optical assemblies include an objective lens which is positioned between the objective lens and the disc surface. The SIL is positioned very close to the data surface of the disc and is described in U.S. Pat. No. 5,125,750 to C. Orle et al., which issued Jun. 30, 1992, and in U.S. Pat. No. 5,497,359 to Mamin et al., which issued Mar. 5, 1996. In these optical systems, a laser beam is focused onto the SIL using an objective lens. The SIL is preferably carried on a slider and the slider is positioned close to the disc surface. Use of an SIL increases storage density.

The slider includes an air bearing surface to fly the SIL above the disc surface. The slider includes a leading edge and a trailing edge. Rotation of discs creates a hydrodynamic lifting force under the leading edge of the slider to lift the leading edge of the slider to fly above the disc surface in a known manner. The slider preferably flies with a positive pitch angle in which the leading edge of the slider flies at a greater distance from the disc surface than the trailing edge via a suspension assembly which includes a load beam and gimbal spring. The slider is coupled to the load beam via the gimbal spring. The load beam applies a load force to the slider via a load button. The load button defines an axis about which the slider pitches and rolls via the gimbal spring. The slider is preferably resilient in the pitch and roll direction to enable the slider to follow the topography of the disc.

The flexure of the gimbal spring permits the air bearing slider to pitch and roll as the slider flies above the disc surface. It is important to maintain the proximity of the SIL and slider relative to the disc surface to maintain the proper focus of light onto the disc surface as is known for optical disc drive systems. It is important that the flexure system including the load beam and the gimbal spring be designed to stably and accurately support the slider during operation of the disc drive system. In a magneto-optic (M-O) system, a magnetic transducer element is carried on the slider to write data to the disc surface. It is also important to accurately support and position the magnetic transducer elements relative to the disc surface during operation of an M-O system.

An actuator mechanism is coupled to the suspension assembly to locate the SIL relative to selected disc positions for operation of the disc system. During movement of the suspension system, force is transmitted through the load beam and gimbal spring to move the slider. Operation of the actuator mechanism, air bearing surface, and spindle motor introduce external vibration to the slider and suspension assembly. Depending upon the mass and stiffness of the suspension assembly, including the gimbal spring and load beam, external vibration may excite the load beam and gimbal spring at a resonant frequency. Thus the input motion or external vibration may be amplified substantially, causing unstable fly characteristics and misalignment of the slider relative to the disc surface.

External vibration or excitation of the suspension assembly and slider may introduce varied motion to the slider and suspension assembly. Depending upon the nature and frequency of the excitation force, the slider and suspension assembly may cause torsional mode resonance, sway mode resonance, and bending mode resonance. Torsional mode motion relates to rotation or twisting of the suspension assembly about an in-plane axis. Bending mode resonance essentially relates to up-down motion of the suspension assembly relative to the disc surface. Sway mode vibration relates to in-plane lateral motion and twisting. It is important to limit resonance motion to assure stable fly characteristics for the SIL. In particular, it is important to control the torsion and sway mode resonance, since they produce a transverse motion of the slider, causing head misalignment with respect to the data tracks on the disc surface.

The resonance frequency of the suspension assembly is related to the stiffness or elasticity and mass of the suspension system. Thus, it is desirable to design a suspension system which limits the effect of sway mode and torsion mode resonance in the operating frequencies of the disc drive while providing a suspension design which permits the slider to pitch and roll relative to the load button, and which has relatively high lateral rigidity and stiffness for maintaining precise in-plane positioning of the slider along the yaw axis.

It is also highly desirable to incorporate a deflection limiter in the design of the suspension assembly.

Deflection limiters are beneficial for several reasons. During a shock event, such as dropping the disc drive or HGA shipping tray, the mass of the head and lens can pull the gimbal away from the load beam if there is no deflection limiter. This deflection will induce stress in the gimbal. The stress could be high enough to yield the gimbal and result in dimple separation and changes to the pitch and roll static angle of the gimbal. A deflection limiter will prevent this from happening by ensuring that the deflection is not large enough to cause the stress to reach the yield point. Deflection limiters are also beneficial for ramp load/unload applications, especially with negative pressure air bearings.

SUMMARY OF THE INVENTION

Thus it is an object of the present invention to provide an improved suspension system for a disc drive. More specifically, it is an objective to provide an improved suspension design which utilizes a simplified design approach to providing a deflection limiter in a suspension system.

A further object of this invention is to provide an improved suspension which limits the resonance motion and the vertical travel of the gimbal to assure stable flying characteristics for the gimbal. More specifically, the objective of the invention is to limit the rotational or twisting motion of the suspension as well as the up-down motion of the suspension or gimbal relative to the disc surface.

These and other objectives of the invention are achieved by providing a gimbal spring which flexibly supports the slider relative to the disc surface. The design incorporates a base mounting portion which connects the gimbal spring to a load beam and thereby to the actuator of the disc drive which positions the gimbal and slider over a desired track on the disc. The gimbal includes opposed spaced flexure arms which are formed of elongated members, each having a proximal end and a distal end which define an opening therebetween, the proximal ends of the flexure arms being operably coupled to the base portion, and the distal end being cantilevered. A mounting tab is positioned between the ends of the flexure arms and supports the slider. Bridge sections are provided which connect the distal ends of the flexure arms to the mounting tab, the bridge sections extending at an angle relative to the flexure arms and being angled back toward the base section of the gimbal. More specifically, the bridges are curved to conform to the curvature of an optical lens mounted on the slider to be used to read information from or store information on the surface of the disc.

In a further feature, a deflection limiter is provided by defining a limiter comprising a continuous member extending across the width of the load beam tongue. The limiter extends over one surface of the load beam tongue; the opposite surface of the load beam tongue supports the slider. Preferably, the limiter extends from one section to the other so that the load beam is captured, and its vertical movement restrained, between sections and the limiter.

Another unique feature of this design approach is that it places the limiter and bond tongue towards the leading edge of the slider. This is beneficial for a ramp load/unload device since it will tend to lift the slider by the leading edge and prevent the leading edge of the slider from crashing into the disc as other gimbal/limiter concepts do that constrain motion at the trailing edge of the gimbal.

Other features and advantages of the invention can be found by reference to the attached drawings and accompanying description of an exemplary embodiment

BRIEF DESCRIPTION OF THE DRAWINGS

FIG. 3 is a top view of a suspension assembly coupled to an actuator mechanism for supporting a slider relative to a disc surface (not shown).

FIG. 4 is a cross-sectional view taken along line 4—4 of FIG. 3.

DETAILED DESCRIPTION OF THE PREFERRED EMBODIMENTS

Figure 1:
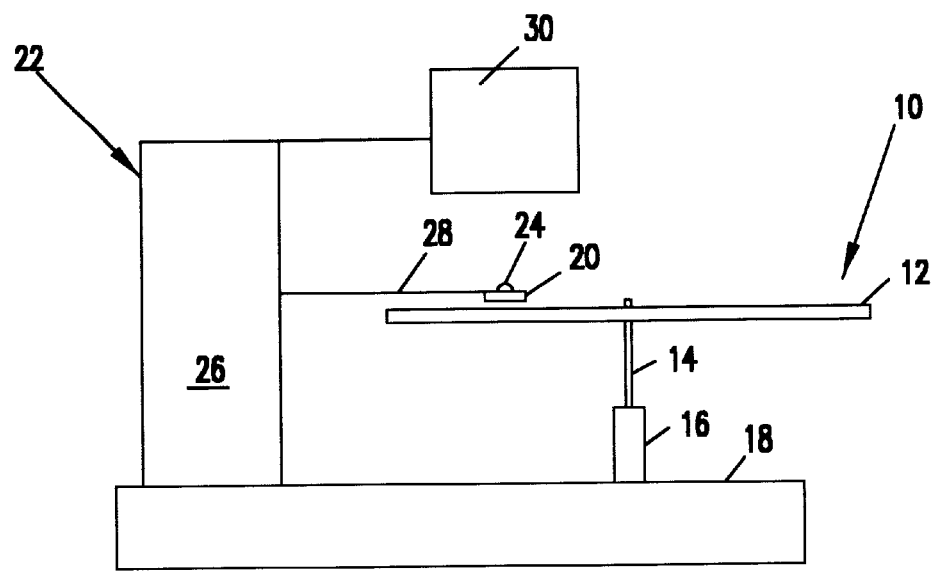
FIG. 1 is a schematic illustration of operation of an optical disc drive system.

FIG. 1 is a simplified diagram illustrating an optical storage system using a solid immersion lens (SIL). Obviously, the invention can be used with many other slider designs and associated lenses. Optical system 10 includes an optical disc 12 having a data surface which carries optically encoded information. Disc 12 rotates about spindle 14 and is driven by a spindle motor 16 mounted on base 18. A slider 20 is movably supported relative to disc surface 12 via an actuator mechanism 22.

The slider 20 supports an SIL 24 for focusing a laser beam of an optical system on the disc surface for reading optically-encoded information. The actuator mechanism 22 preferably includes a voice coil motor 26. The slider 20 is coupled to the voice coil motor via a suspension assembly 28. The optical system includes an optical head 30 which preferably is coupled to the actuator mechanism 22 and operated thereby. The optical head 30 includes a laser beam which is focused onto the disc surface via the SIL 24 in a known manner for operation of the optical disc drive system.

Figure 2:
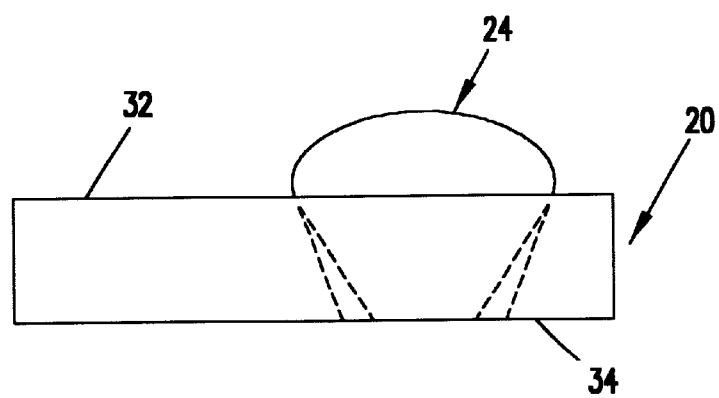
FIG. 2 is a side view of a slider supporting an SWL.

FIG. 2 illustrates the slider 20 and SIL 24 construction. Preferably, the slider is formed of a transparent material, such as a cubic zirconia. The SIL 24 is bonded to the slider 20 or, alternatively, the slider 20 and SWI 24 may be formed of an integral material machined from a single piece of crystal. For example, the integrated SIL 24 and slider 20 can be formed by injection molding a single piece of transparent material such as a commercially available polycarbonate in a known manner. The slider 20 includes an upper surface 32 and a lower air bearing surface (ABS) 34 (surface not visible in FIG. 2) which is formed in a known manner to provide a hydrodynamic lifting force to the slider 20 and the lens 24 via rotation of optical disc 12 in a known manner.

The slider 20 is supported by a suspension assembly 28 operably coupled to the actuator mechanism. In particular, as illustrated in FIG. 3, the suspension assembly 28 includes a load beam 36 and a gimbal spring 40. Preferably, the load beam 36 is formed of an elongated flexible material which includes side rails 44 and a load tab 46 having load button 48 (on a lower surface of load tab 46) at an extended end of the load beam 36 as will be explained. Side rails 44 provide lateral and bending stiffness and a means for connecting wires (not shown) to the slider 20.

The gimbal spring 40 is coupled to the load beam 36 and flexibly supports slider 20 relative to the load beam 36. The load button 48 applies a load force to the upper surface 32 of the slider and defines a gimbal pivot axis 50 about which the slider 20 can pitch, and pivot axis 68 about which the slider 20 can roll, relative to the disc surface for operation of the disc drive.

The lower air bearing surface 34 of the slider 20 (not shown) faces the disc surface so that rotation of disc 12 provides a hydrodynamic lifting force to the slider 20 which flies above the disc surface as data is read and written to the disc surface. The load force counteracts the hydrodynamic lifting force of the ABS.

The slider is lifted via the ABS surface to fly at a pitch angle relative to the disc surface. During operation of the disc drive, it is important to maintain a stable fly height for slider 20 close to the disc surface and that the slider 20 be able to pitch and roll to follow the topography of the disc surface. Thus, the gimbal spring 40 should be designed to support the slider relative to the load beam to allow sufficient pitch and roll of the slider 20 during operation. If the pitch and roll stiffness of the gimbal spring is too low, it will be difficult to control the fly characteristics of the slider and the gimbal will exhibit undesirable resonance behavior. If the gimbal spring 40 is too stiff in the pitch and roll axes, then the slider will not be able to follow the topography of the disc surface.

During operation, the actuator mechanism 22 moves the suspension assembly to position the slider 20 and SIL 24 relative to selected positions on the disc surface. Rotation of the disc supplies a lifting force to the slider 20 at the ABS surface. Operation of the slider thus introduces vibration to the suspension system which, depending on the construction of the suspension assembly and gimbal spring 40, may coincide with the resonance frequencies of the suspension system, causing the external motion to be amplified. Vibration of the suspension system at the resonance frequencies may interfere with placement and operation of the slider 20. Typical excitation forces are fairly low-frequency, less than 10,000 Hz. Thus, it is desirable to design the gimbal spring so that its resonance frequencies are high to avoid resonance vibration at typical operation frequencies of the disc drive.

Further, as discussed, during operation of an optical disc drive, a slider 20 supports an SIL 24 above the disc surface via operation of the ABS surface and the load force of the load beam 36. Depending upon the position of the load button 48 and gimbal pivot 50, the weight of the SIL 24 may be unbalanced relative to the load position and during operation may excite the gimbal spring 40. Depending upon the design of the suspension system, this vibration is amplified at the resonance frequency, thus degrading the performance of the slider and SIL 24. The gimbal spring 40 of the present invention is designed to provide desirable pitch and roll stiffness with desired resonance frequency as will be explained.

Further, during a shock event the mass of the head and lens can pull the gimbal away from the load beam in the absence of some deflection limiting mechanism. This deflection will induce stress in the gimbal. The stress could be high enough to yield the gimbal and result in dimple separation and changes to the pitch and roll static angle of the gimbal. A deflection limiter will prevent this from happening by ensuring that the deflection is not large enough to cause the stress to reach the yield point.

As shown in FIG. 3, the slider includes a leading edge 52 and a trailing edge 54, and the distance between the leading edge and trailing edge defines the longitudinal extent of the slider. The SIL 24 is positioned toward the trailing edge 54 of the slider 20 on a rear portion of the slider 20. Since the SIL 24 is positioned along the rear portion, the distribution of weight between forward portion and rear portion is unbalanced. The load tab 46 extends from the leading edge 52 over a forward portion 58 of the slider. The load tab 46 is sized to extend over the forward portion 58 to a center portion of the slider so that the pivot axis 50 is generally at the center portion of the slider 20 for flight stability of the slider 20 during operation.

The suspension assembly illustrated in FIG. 3 illustrates an embodiment of a gimbal spring 40 of the present invention for supporting slider 20 designed to optimize pitch and roll stiffness and gimbal resonance characteristics while incorporating deflection limiting capability. As shown, the gimbal spring 40 generally includes spaced flexure arms 62, 64 and a slider mounting tab 66. The gimbal spring 40 is cantileveredly supported relative to the load beam 36 via a mounting portion (not shown but well known in the industry). Spaced flexure arms 62, 64 are supported by and extend from the mounting portion in spaced cantilevered relation. Slider mounting tab 66 is operably coupled to the flexure arms 62, 64 and is fixedly secured to the slider 20 to flexibly support the slider 20 relative to the load beam 36 to gimbal (pitch and roll) relative to pivot axis 50 and 68.

The flexure arms 62, 64 are spaced relative to the width of the slider 20 a certain distance from the centerline 68, and width 70 of each of the flexure arms 62, 64 is sized to provide desired roll characteristics. If the flexure arms 62, 64 are spaced too far apart, roll stiffness increases and if spaced too close, roll stiffness is too low. If the width 70 of the flexure arms 62, 64 is too thick, roll stiffness increases and if too thin, roll stiffness is too low. Flexure arms 62, 64 include a proximal end 72 and a distal end 74. The proximal end 72 is coupled to the mounting portion and distal end 74 is coupled to mounting tab 66. The proximal end 72 is fixed relative to the load beam 36 and the distal end 74 flexibly supports slider 20 relative to the pivot axis 50. As shown, the distal end 74 is cantilevered beyond the pivot axis 50 of slider 20 to provide desired pitch stiffness relative to load button 48 at pivot axis 50. The extent or length of the flexure arms 62, 64 tends to decrease the pitch stiffness based upon the width and thickness of the flexure arms 62, 64. The extent between the proximal and distal ends 72, 74 is sufficient so that when mounting tab 66 is coupled to the upper surface of the slider 20 and load button 48 is aligned generally at the center portion 59 of the slider 20, a portion of the flexure arms extends beyond pivot axis 50 to provide sufficient pitch stiffness for desired fly characteristics.

As shown, the length of the flexure arms 62, 64 is designed so that when the mounting tab 60 is secured to the load beam 36 and load beam 36 is positioned so that the load button supplies a load force to the center portion 59 of the slider, the distal end 74 extends beyond the pivot axis 50 but does not extend along the entire rear portion 56 to the trailing edge of the slider 20. The shortened length provides increased gimbal resonance frequencies for bending or torsion of the gimbal as compared to flexure arms having a greater flexure length for movably supporting the slider relative to the pivot axis 50. The design also provides a reduced width and offset flexure arms 62, 64 having lower roll stiffness.

As shown, mounting tab 66 couples the distal end 74 of flexure arms 62, 64 to slider 20. For an optimal disc drive system, placement of mounting tab 66 is restricted by the SIL 24. In the embodiment shown, the SIL 24 is supported in the rear portion 56, thus interferes with placement of mounting tab 66 in alignment with the distal end 74 of flexure arms 62, 64.

Thus as shown, the distal ends 74 of flexure arms 62, 64 are coupled to a proximally spaced mounting tab 66 via bridges 76, 78. Bridges 76, 78 extend at a sloped angle to connect distal ends 74 of flexure arms 62, 64 to the proximally spaced mounting tab 66. The sloped design of bridges 76, 78 provides a direct connection between distal end 74 of flexure arms 62, 64 and mounting tab 66 which does not require additional width between arms 62, 64. The angled relation between distal end 74 and bridges 76, 78 defines a gap 82 between flexure arms 62, 64 and bridges 76, 78 for desired flexure of the gimbal spring. Sides 83, 84 of bridges 76, 78 are preferably curved to the contour of the SIL for placement close to the SIL and a side 86 of the mounting tab 66 is also curved to the contour of the SIL. The length of the flexure arms from axis 50 to distal end 74 is important in providing a pitch stiffness low enough to allow proper flying characteristics. The curved shape of the flexure mounting tabs or bridges 76, 78 allows this increased length. This design also keeps the dimple in the midsection of the arms.

Thus, as described, the gimbal spring 40 of the present invention is not limited to the shape of the particular mounting tab 66 shown; alternately designed mounting tabs 66 may be designed to secure the flexure arms 62, 64 relative to the slider 20. If there is not sufficient area, SIL 24 will restrict placement of the load button 42 toward the center of slider 20. Preferably, the load button 48 is formed by an etching process. The load button or dimple 48 formed by the etching process requires less surface area to form the dimple than traditionally formed dimples. Thus, the load button 48 formed by the etching process limits the contact to the slider 20 and provides sufficient surface area to mount the mounting tab 66 and wire termination pads relative to the upper surface 31 of the slider 20.

Thus, as described, the bridge design of the present invention illustrates the shape of a preferred embodiment of the gimbal spring 40 of the present invention.

In summary, in addition to significantly lower roll stiffness, the new gimbal design also greatly increases the resonance frequencies of the gimbal resonance modes. The reduced roll stiffness is further aided by reducing the thickness of the gimbal from 0.0015" to 0.001" and reducing the width of the arms 62,64. However, if these were the only changes, the gimbal would probably have unacceptably low gimbal resonance frequencies. To overcome this problem, the bond or slider mounting pad 66 was moved from the trailing edge of the lens 24 to the leading edge. This reduced the length of the gimbal arms 62, 64 and greatly increased the resonance frequencies of the gimbal modes.

If the gimbal arms 62, 64 are shortened too much, the entire length of the gimbal arms would be on the leading edge side of the load point. It is highly desirable for pitch stiffness to have some length of the gimbal arms on both sides of the load point. To accomplish that with this design, a unique feature was incorporated. The unique feature is the circular shape or edge to the bond pad. The circular shape follows the profile of the objective lens 24 and allows the gimbal arms 62, 64 to be extended past the load point towards the trailing edge of the slider. In FIG. 3, if the straight lead edge 69 of the bond pad 66 were extended-straight out until it intersected the gimbal arms 62, 64 the region 73 would be filled in and solid. As a result, the pitch stiffness would be approximately 50% higher.

This design is also especially adaptable to incorporate a deflection limiter. The deflection limiter in this application comprises a continuous member 90 supported from the slider mounting pad 66 and extending across the width of the low beam tongue 46. The limiter extends across the opposite surface of the tongue which contacts the dimple 48. This makes the limiter 90 which is supported from the bonding pad 66 very strong and able to resist great forces without bending or otherwise allowing the limiter to become disengaged and maintains the load tab 46 in contact with the load button 48. Another benefit of the design is that the limiter is very strong and able to resist great forces without bending or otherwise allowing the limiter 90 to become disengaged and allowing the slider to deflect without restriction.

A further feature of this design approach is that it places the limiter 90 and the bond tongue 46 toward the leading edge of the slider. This is very beneficial for a ramp load/unload device since it will tend to lift the slider by the leading edge and prevent the leading edge of the slider from crashing into the disc as other gimbal/limiter concepts may do, which constrain motion of the trailage edge of the gimbal. The construction of the present invention is further shown in FIG. 4 at the left-hand side the load beam 36 is shown with upraised tabs 92, 94 which are used to hold the electrical connectors in the load beam as they extend out to the transducer (not shown) supported on the slider. The figure also shows the slider 20 supporting the lens 24, with movement of the slider relative to the mounting tab 66 being freely available over contact 66 and the dimple 48. The limiter is formed by providing a substantially vertical connecting portion 92 between the rear of the mounting tab 66 and the limiter 90 so that the limiter 90 is substantially parallel in a parallel plane but in a different elevation. The low beam 46 can be extended through an opening 95 (FIG. 3) between mounting tab 66 and limiter 90, encaptured between these two sections to restrain vertical movement of the load beam 46 relative to the slider, so that the slider cannot easily separate itself from the load beam.

Although the present invention has been described with reference to preferred embodiments, workers skilled in the art will recognize that changes may be made in form and detail without departing from the spirit and scope of the invention.

What is claimed is:

1. A gimbal spring adapted to flexibly support a slider relative to a disc surface for operation comprising:
    a base mounting portion adapted to operable connect the gimbal spring relative to a load beam and thereby to an actuation system;
    opposed spaced flexure arms extending from the base, said flexure arms being formed of elongated members each having a proximal end and a distal end defining an elongated extent therebetween, said proximal end being operable coupled to the base and said distal end being cantilevered relative to the base;
    a mounting tab adapted to connect to a slider, said mounting tab being positioned between the spaced flexure arms and ends of the mounting tab being spaced a distance from said flexure arms;
    bridge sections adapted to connect the distal ends of the flexure arms to the mounting tab, the bridge extending from the distal end of the flexure arms toward the proximal end at a sloped angle relative to said flexure arms to connect a distal end of the flexure arms relative to the mounting tab; and
    a limiter supported by and extending between said bridge sections and lying over vertically opposed side of said load beam from said gimbal spring to restrain vertical movement of said gimbal, the limiter being connected to the mounting tab and vertically and axially spaced from the mounting tab so that the limiter is parallel to the tab but in a separate plane from the tab, wherein the limiter and the mounting tab form an opening whereby the load beam extends through the opening and is captured by said opening to restrain vertical movement of said load beam.

2. The gimbal spring of claim 1 wherein the gimbal spring is adapted to support a slider supporting an optical lens.

3. The gimbal spring of claim 2 wherein said bridge sections supporting a slider mounting tab including a surface opposite to that faced by said limiter and contacting a dimple on said slider.

4. In a head suspension assembly including a load beam supporting a gimbal spring having a load button at an extended end of the gimbal, a slider having a leading edge and a trailing edge, said gimbal spring having a base mounting portion operably coupled to the load beam and a mounting tab operably coupled to the slider, and opposed spaced flexure arms each having a proximal end and a distal end, the proximal end of the flexure atms to flexibly support the slider relative to the load beam, the gimbal spring being coupled to the load beam and adapted to support the slider so that the load button provides a load force to the slider at a pivot axis of the slider relative to the gimbal spring, and a limiter supported between said flexure arms and overlying a side of said load beam to restrain vertical movement of said load beam the mounting tab positioned proximal of the distal end of the flexure arms and operably coupled to the distal end of the flexure arms by bridge arms extending from the distal end of the flexure arms toward the proximal end, the slider supported on an opposite side of said load beam from said limiter the limiter supported between said bridge arms to extend over the load beam, the limiter being connected to the mounting tab and vertically and axially spaced from the mounting tab so that the limiter is parallel to the tab but in a separate plane from the tab, wherein the limiter and the mounting tab form an opening whereby the load beam extends through the opening and is captured by said opening to restrain vertical movement of said load beam.

5. The assembly of claim 4 wherein said limiter is supported from the rear of said mounting tab.

6. The head suspension assembly of claim 5 wherein the pivot axis is positioned in a center portion of the slider between the leading and trailing edges.

7. The head suspension assembly of claim 5 wherein the gimbal spring is adapted to support the slider supporting an optical lens.

8. The head suspension assembly of claim 5 wherein the mounting tab is coupled to the slider at the pivot axis.

9. The head suspension assembly of claim 8 wherein the mounting tab is an elongated rectangular shaped member having opposed ends adapted to couple to an upper surface of the slider and extending between opposed sides of the slider where opposed ends are aligned with opposed sides of the slider, and where the mounting tab is depressed relative to a plane established by said flexure arms.

* * * * *